March 29, 1960

G. E. HAGEN 2,930,316

DATA PROCESSING APPARATUS

Filed Nov. 18, 1957

INVENTOR:
Glenn E. Hagen

Attorneys

March 29, 1960 G. E. HAGEN 2,930,316
DATA PROCESSING APPARATUS
Filed Nov. 18, 1957 7 Sheets-Sheet 2

INVENTOR
Glenn E. Hagen
By Smyth & Roston
Attorneys

Fig. 8a

INVENTOR:
Glenn E. Hagen

March 29, 1960 G. E. HAGEN 2,930,316
DATA PROCESSING APPARATUS
Filed Nov. 18, 1957 7 Sheets-Sheet 5

Fig. 8b

INVENTOR.
Glenn E. Hagen
By Smyth & Roston
Attorneys,

United States Patent Office 2,930,316
Patented Mar. 29, 1960

2,930,316

DATA PROCESSING APPARATUS

Glenn E. Hagen, New York, N.Y.

Application November 18, 1957, Serial No. 697,223

21 Claims. (Cl. 101—93)

The invention relates to recording equipment which is constructed to be coupled to different types of business and other machines for data processing purposes.

Many types of automatic and semi-automatic accounting machines have been devised and built in recent years. These machines have resulted to a large extent in the mechanization of general accounting routines and other business matters of a routine nature. Moreover, data processing systems and apparatus have been devised and used in many business establishments for storing the vast amount of data pertinent to such business matters.

An important object of the present invention is to provide a recording unit which can be conveniently coupled to almost any type of business machine to provide a link which immediately permits full-scaled integrated data processing in a complete economical and efficient form. Accounting machines, electric adding machines, cash registers and many others are included in the group of business machines to which the recorder of the invention can be quickly attached and with which the recorder finds general utility.

A large group of business machine provides a multi-digit recording by the linear movement of individual rack members to different individual positions from a neutral position. In the common adding machine, for example, a block of digits for a multi-digit number are set up in a group of separate racks. These racks are individually moved from a neutral position to individual displaced positions corresponding to the different digits of the particular bloc. The recording mechanism of the invention is adapted to be connected to such racks by a series of individual mechanical couplers which are coupled to respective ones of the racks. As the racks in the adding machine are moved to their different positions, corresponding rack members in the recording machine are also shifted. Then, when the operating crank of the adding machine is actuated to move the racks in unison and print the block of digits on its recording medium, this crank is coupled to the recorder of the invention so that a like action occurs in the recorder.

It will be evident, however, that the recording mechanism of the invention is not limited to adding machines. The recorder can be used in conjunction with almost any type of business machine which includes separate members that move in correspondence to the different digits being set up. When such motion is linear, the recorder of the invention may conveniently include similar linearly movable members, and the members of the recorder may be individually coupled to the members of the business machine through appropriate couplers such as piano or "Bowden" wires.

Alternately, when the motion of the members in the business machine is rotary, gear couplers can be used, and the members at the recorder of the invention may take the form of notched disks. This latter coupling and configuration of the recorder of the invention is most appropriate for use with utility meters, gas pumps, time clocks, weighing devices and so on. This permits for the storing of data from such instruments automatically and immediately, instead of the need to resort to the manual reading of the instruments and the subsequent storing of the information.

In a preferred embodiment of the invention, the data is recorded on a paper recording tape by means of printing, rather than by perforating the tape as is sometimes practiced at the present time. The tape may, for example, have a width of one-quarter of an inch. Because the tape need not be strong enough to withstand perforation, it may be much thinner than the tape used for the punched tape operations referred to above. The tape used in a constructed embodiment of the invention was roughly ten times more compact and had ten times less mailing weight than the usual five channel tape used in present-day punched tape operations. Moreover, the tape used in the constructed embodiment of the invention housed about 30,000 decimal digits per cubic inch of paper, so that it was at least one hundred times more compact for storing numerical data than the usual punched cards.

The fact that the recording medium used by the recorder of the invention may be light in weight, compact and inexpensive and that the medium can be stored away as a record capable of being audited are important features and advantages of the present invention.

The recorder of the invention in a preferred embodiment prints an entire entry or block of digits on the recording tape at a single stroke. This obviates any requirement for memory storage units or scanning equipment in the recorder. The information in each block, for example, may include up to the order of sixteen or more digits. The preferred recording code at present is not binary. As will be described, the code is essentially a four channel type and is designed to represent successive positions of a printing rack moving transversely across the tape. However, it will be evident that other codes can be used.

Although block recording is an important advantage of the recorder of the invention, there are applications in which the recorder may be used wherein the data is developed at a stroke at a time. It will be evident that the recorder of the invention will find utility in this latter application.

In brief, therefore, the invention provides improved recording apparatus for data processing. The recorder of the invention is small and compact, and it efficiently records data by impriting it on a recording tape. This recording is such that the tape requires only a fraction of the storage area required by most media used in present day data processing systems. The light weight of the tape and its high information density permit it to be economically stored or mailed.

In the drawings which are representative of one embodiment of the apparatus of the invention.

As noted above, Figures 1 and 2 represent the type of paper recording tape that may appropriately be used in the mechanism of the invention, and they also show a suitable code for use in conjunction with the tape. As also noted above, multidigit numbers are printed in a single stroke directly on the tape by the mechanism of the invention. These numbers are recorded in separate blocks which are spaced along the tape at fixed intervals.

Figures 1, 2, 3:
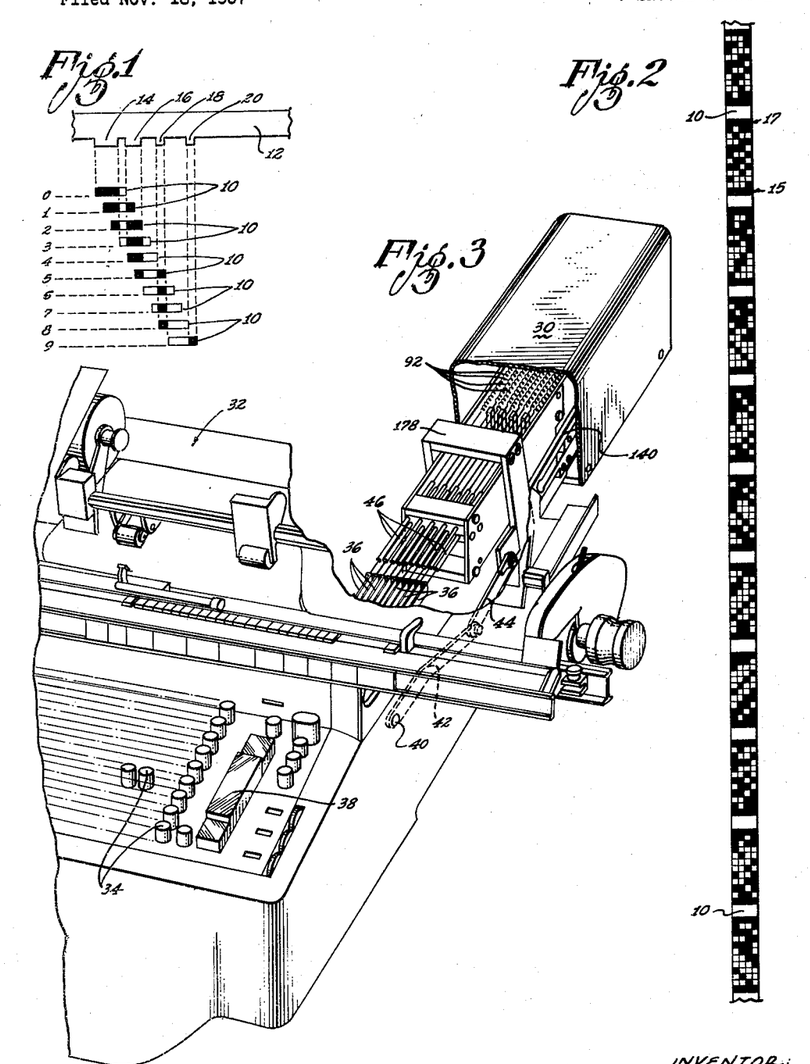
Figure 1 is an explanatory diagram illustrating a printing rack and a recording tape, the purpose of this diagram being to aid of the explanation of the particular code in one embodiment of the invention.
Figure 2 illustrates a fragment of a typical tape used in the recording apparatus of the invention, and this representation illustrates the manner in which the data may be imprinted in a series of multidigit blocks along the tape.
Figure 3 is a perspective view of a typical adding machine coupled to the recording apparatus of the invention, this view illustrating the individual mechanical couplers extending from the racks in the adding machine, and also illustrating a linkage from the operating crank of the adding machine to the unit of the invention.
Figure 4:
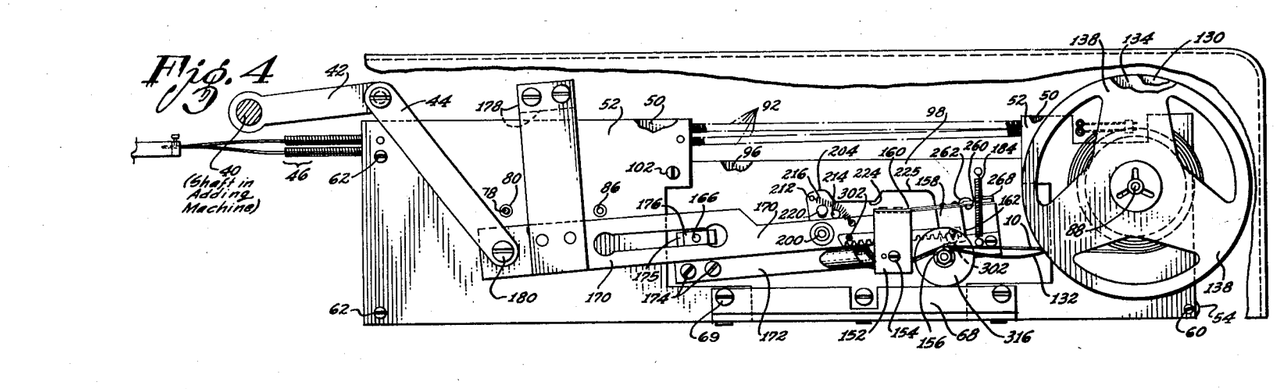
Figures 4 and 5 are side views of the apparatus of the invention, and these views particularly illustrate a pair of actuating arms and associated components which serve to draw the recording tape through the apparatus and which also serve to operate a roller for causing the data to be recorded in multidigit blocks at spaced intervals along the tape.
Figure 5:
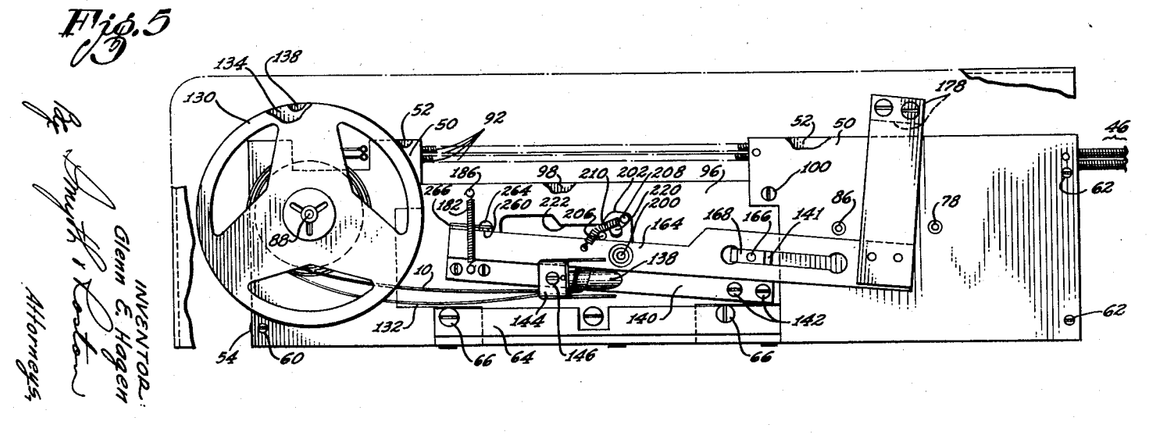

The individual digits of each multidigit block are recorded in adjacent channels extending transversely across the tape. As shown in Figure 2, for example, a paper recording tape 10 has a series of blocks of data spaced along its length. Each of the blocks in the illustrated embodiment represents a ten-digit number, with each digit being recorded in an adjacent transverse channel. Each block also includes a leading channel and a trailing channel which is completely marked to designate precisely the beginning and ending of each block.

The particular code used for imprinting a selected integer in any of the channels is shown in Figure 1. In that figure, for example, a printing rack 12 is shown schematically, and this rack has a series of spaced segments. In the apparatus to be described, a plurality of printing racks, each like the rack 12, are placed adjacent one another and are adapted to move transversely of the tape in the adjacent channels of each block. This enables any integer from "0" to "9" to be imprinted in a corresponding channel in the block.

For the tape of Figure 2, for example, ten printing racks are provided, and these racks are individually controllable, so that each channel in each block may be imprinted to represent any integer from "0" to "9," inclusive.

The paper tape is drawn intermittently through the recorder mechanism, and a carbon tape is also drawn through the recorder, so that when the tapes are brought down on the racks, the rack segments cause a particular pattern to be imprinted through the carbon tape in each column of the block being recorded at any particular time on the paper tape. In this manner, as the tapes are intermittently drawn through the machine, blocks of data are simultaneously imprinted on the paper tape, the data in each block being set up through a control of the printing racks.

For purposes of convenience, and in order to demonstrate the code used in a particular embodiment of the invention, the rack of Figure 1 may be considered as stationary, and the tape 10 may be considered as being moved transversely from one position to another. Of course, in the actual mechanism the converse is true, the tape being stationary and the rack 12 moving transversely of the tape.

The code used is essentially a four-position code. The rack 12 has a first segment 14 which has a width corresponding to three positions on the tape. Then, with the tape bearing the relation shown to the printing rack at the zero position, the first three positions on the tape would be imprinted and the fourth position would be blank to designate the "0" integer.

For the "1" integer, the tape effectively moves one position to the right (as the rack moves one position to the left). The rack 12 includes a second segment 16 which has a width corresponding to two positions, and which is spaced one position from the segment 14. Therefore, for the "1" integer, the relation shifts by one position from the "0" integer so that the imprinted code is as shown with the first two positions and the last being printed. Likewise, for the "2" integer, the tape and rack shift by another position so that the code is as shown. That is, the "2" integer is represented by the first position in the channel and the last two being printed.

The rack 12 has a third segment 18 which has a width corresponding to one position and which is spaced from the segment 16 by a distance corresponding to two positions. Therefore, the "3" integer has the illustrated code, by which the center two positions in the channel are printed. For the "4" digit, the first two positions in the channel are printed. In like manner, for the "5" integer, the segment 18 moves against the carbon tape so that it has the illustrated code in which the first and fourth positions are printed.

The printing rack 12 also has a segment 20 which has a width corresponding to one position and which is spaced from the segment 18 by an amount corresponding to three positions. For this reason, for the "6" integer the third position only is printed; for the "7" integer the second position only is printed; and for the "8" integer the first position only is printed. Finally for the "9" integer segment 20 engages the carbon tape so that it has the illustrated code in which the fourth position only in the channel is printed.

It is clear, therefore, that as the tape 10 is moved intermittently in Figure 1 out of the plane of the paper and as the printing rack is shifted from one position to another transversely of the tape and in a direction toward the right or left in Figure 1, any integer from "0" to "9" inclusive, may be imprinted on the tape by the printing rack. Likewise, by the provision of like printing racks adjacent one another, and each such rack having the same segment arrangement, all of the digits of each of the printed blocks shown on the tape 10 in Figure 2 may be simultaneously recorded in their respective transverse channels on the tape.

It will thus be seen that the rack 12 is provided with a progressive code such that a movement of the rack through successive fractional distances of the complete length of each integer on the rack provides an indication as to the value of successive integers. For example, each integer is indicated by four positions but successive integers may be indicated by moving the rack through a distance corresponding to only one position.

As will be seen in Figure 2, the values of 10 different digits are printed in a block. Each digit may have any value between "0" and "9" in the illustrated embodiment to provide a numeric coding. However, the coding may be extended to an alphabetic coding or to an alphanumeric coding or to any other type of coding desired. As will also be seen in Figure 2, each block is defined by black strips 15 and 17 on opposite sides of the block. The strips 15 and 17 extend completely along the width of the recorded information.

The recorder mechanism 30 of the invention is illustrated in Figure 3 as being mechanically coupled to suitable control apparatus such as a typical adding machine 32. This adding machine may be, for example, one of the Class 31 manufactured by the National Cash Register Company. As noted, however other types of adding machines or business machines may be used.

The adding machine includes a keyboard 34, and it also includes a plurality of racks 36. The racks 36 are moved in known manner from a neutral position to assume a series of individual positions corresponding to the numbers set up in the adding machine by the manual manipulation of the keyboard 34. Then, when the "add" bar 38 of the machine is depressed to imprint the numbers on the recording medium of the adding machine and to set up the numbers in the adding mechanism of the machine, an operating crank 40 in the machine rotates first in a clockwise direction through 180° and then in a counterclockwise direction through 180°. This operating crank is coupled to the unit of the invention, for reasons to be described, through a pair of linkage arms 42 and 44.

The racks 36 move individually to the right in Figure 3 from a neutral position as a number is set up in the adding machine. They then assume individual positions for each number set up in the adding machine. A plurality of stiff piano wires are coupled from separate ones of the racks 36 to the mechanism 30 to constitute individual mechanical couplers 46. These piano wires may be encased in suitable coaxial housings, and they are capable of transmitting motion from the individual racks 36 to corresponding members in the unit 30, as these racks move to the right in Figure 3. The mechanical couplers 46 may be of the type referred to as "Bowden" wires.

As shown in detail in Figures 4, 5, 6 and 7, the recorder mechanism of the invention includes a pair of side frame members 50 and 52. These frame members are held in spaced parallel relation by a pair of cylindrical spacer blocks, such as the block 54 at one end of the assembly, and by a pair of spacer blocks 56 and 58 at the other end of the assembly. Screws such as the screws 60 extend through the side frames 50 and 52 into the spacer blocks 54 to hold the assembly together, and screws such as the screws 62 extend through the frames into the spacer blocks 56 and 58 for the same purpose.

The frame member 50 is in two sections, and these sections are held together by a channel member 64, this channel member being secured to the side frame 50 by screws 66. Likewise, the frame member 52 is in two sections, and these sections are held together by a channel member 68, the channel member 68 being secured to the frame 52 by screws 69. The channels 64 and 68 also serve as an appropriate mounting means for the unit, and these channels may have suitable apertures formed in them for mounting purposes.

The unit also includes a base plate 70 which extends between the frames 50 and 52 at the bottom of the recorder, and the plate 70 is fastened to cross members extending between the frames 50 and 52 by screws 72.

The individual mechanical couplers 46 from the adding machine 32 of Figure 3 extend through the spacer blocks 56 and 58, and these blocks are held rigidly together by means of a pair of screws 74. In this manner, the outer casings of the couplers 46 are rigidly held in the unit and, of course, their internal wires are free to move within the external casings.

A first group of the internal wires of the mechanical couplers 46 are respectively connected to the upper ends of a series of lever arms 76. These lever arms are pivotally mounted on a shaft 78 which extends transversely between the side frames 50 and 52. This shaft is locked to the side frames by appropriate lock washers such as the washer 80 shown in Figure 4.

Figure 6:
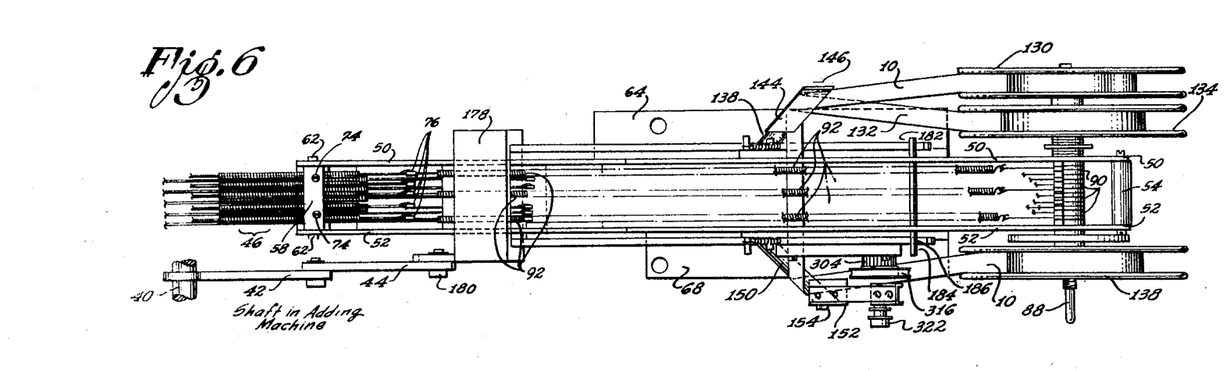
Figures 6 and 7 are respectively top and bottom views of the apparatus of the invention, these views particularly showing a series of lever members and associated springs which control the linear positions of a corresponding series of reciprocally movable racks which are supported within the apparatus.
Figure 7:
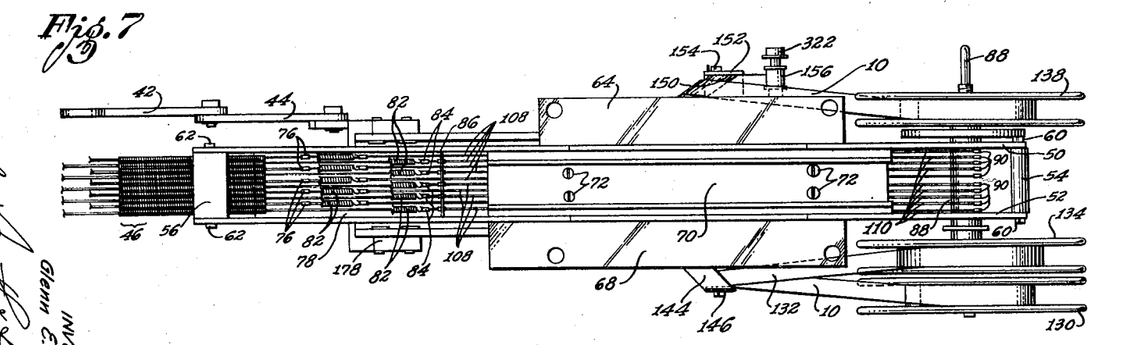

The various levers 76 are spaced one from the other by washers on the shaft 78, and each of these levers is pivoted to the shaft 78 at a point displaced from the center of these levers towards their lower end. The distance ratio between the fulcrum and ends of the resulting lever arms may, for example, be of the order of 2:1. A series of springs 82 are connected from the lower ends of respective ones of the levers 76 to the spacer blocks 56. The springs 82 serve to bias the levers 76 so that their upper ends in Figure 6 are urged to the left in that figure.

A second group of the internal wires of the couplers 46 are connected to the upper ends of respective ones of a series of levers 84. The levers 84 are pivoted to a shaft 86 which extends between the side frames 50 and 52. The shaft 86 is spaced from the shaft 78 towards the center of the assembly and, like the shaft 78, is securely held between the side frames by appropriate lock washers. The levers 84 are held in mutually spaced relation on the shaft 86 by a series of interposing washers on the shaft.

The levers 84 are also each pivoted on the shaft 86 at a point displaced from its midpoints towards its lower ends. As with the levers 76, each of the levers 84 may also have a distance ratio of 2:1 from its fulcrum to its respective ends.

A rotatable shaft 88 extends between the side frames 50 and 52 at the end of the recorder assembly remote from the pivot shafts 78 and 86. A further group of lever arms 90 are pivotally mounted on the shaft 88 between the side frames 50 and 52, and the lever arms 90 are spaced from one another by interposed washers on the shaft 88. The lever arms 90 are pivotable on the shaft 88 at a point displaced from its midpoint towards its upper end. The distance ratio here between the fulcrum and the ends of each lever may, for example, be of the order of 1:2. A plurality of springs 92 are respectively secured to the upper ends of the levers 90, and these springs extend from individual ones of the levers 90 to the upper ends of corresponding ones of the levers 84 and 76.

Figure 8A:
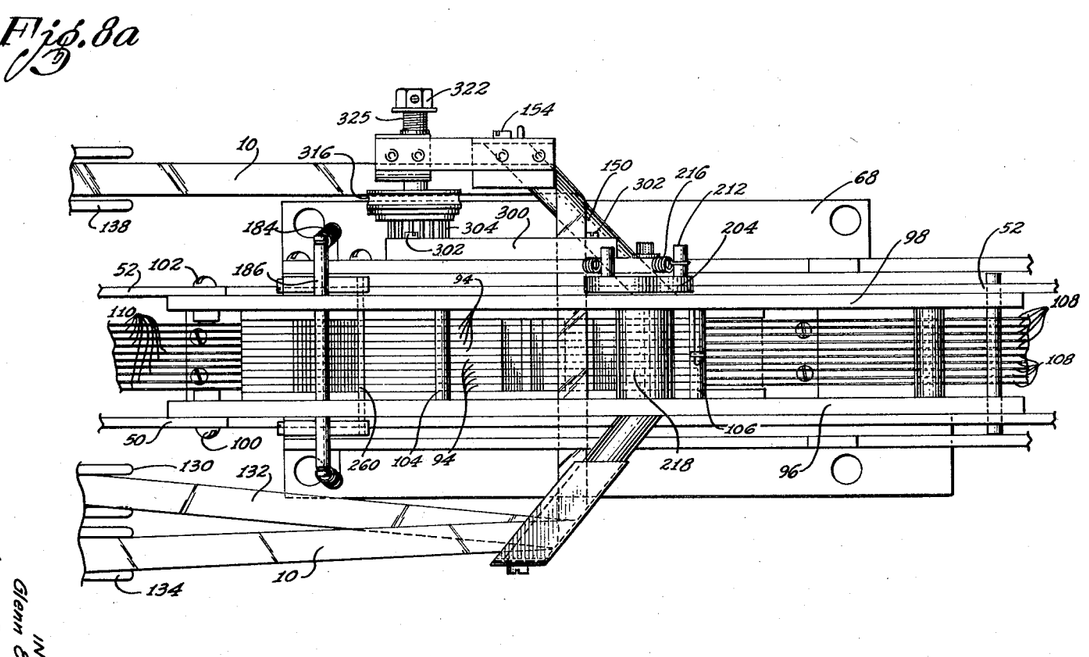
Figures 8A and 8B are top views of the apparatus with the springs referred to above removed so as to expose the linearly movable reciprocating racks which are supported within the apparatus.
Figure 8B:
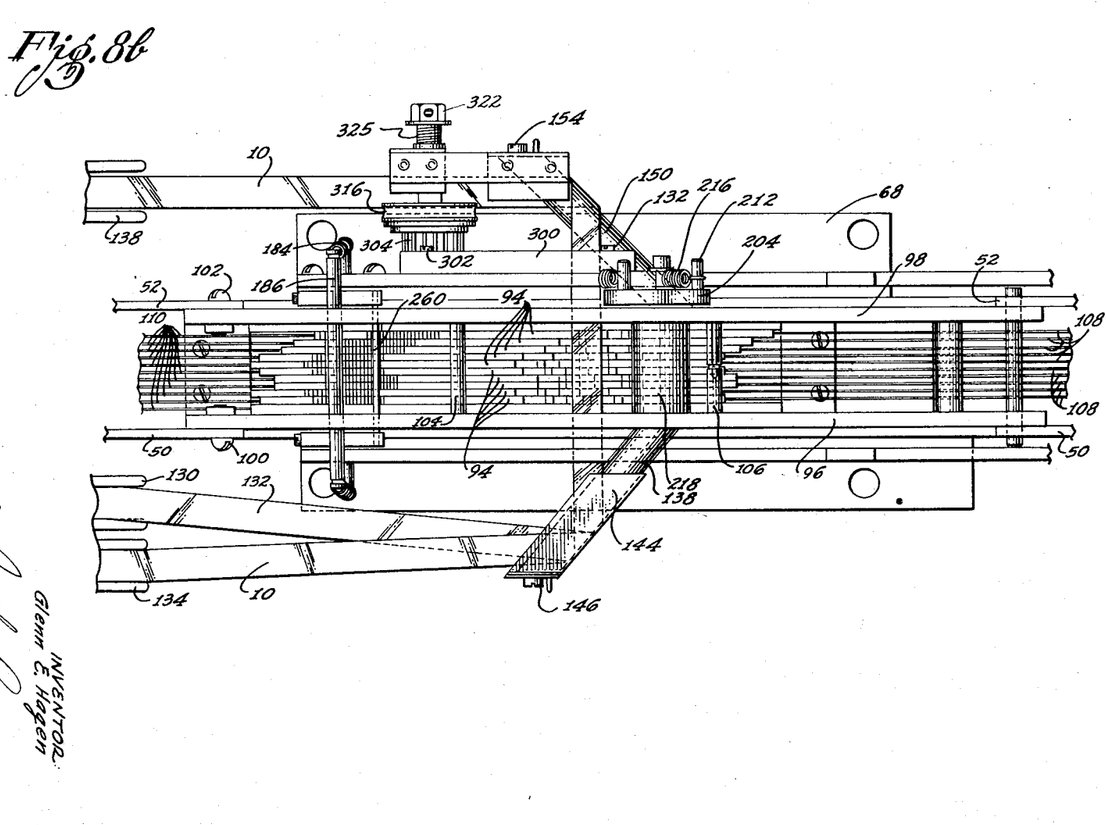

As best shown in Figures 8A and 8B, a plurality of printing racks 94 are mounted adjacent one another between a pair of spaced parallel plates 96 and 98. The plate 96 is secured to the side frame 50 and extends between the two sections of that frame in essentially uni-planar relation with the frame. Likewise, the plate 98 is secured to the side frame 52 and extends in essentially uni-planar relation between the two sections of that frame. The side plate 96 is secured to the frame 50 by screws such as the screw 100, and the plate 98 is fastened to the side frame 52 by screws 102.

The racks 94 may be similar to the printing rack 12, and the racks 94 are supported between the plates 96 and 98 for individual independent reciprocal motion between the plates. A pair of cross rods 104 and 106 extend between the plates 96 and 98 over the top of the printing racks 94. These rods hold the racks in position to prevent them from bouncing out of place. A series of wires 108 respectively connect one end of the racks 94 to the lower ends of the levers 84 and to the lower ends of the levers 76. The other end of each of the printing racks 94 is connected by a corresponding one of a series of wires 110 to the lower end of a corresponding one of the levers 90.

Figure 9A:
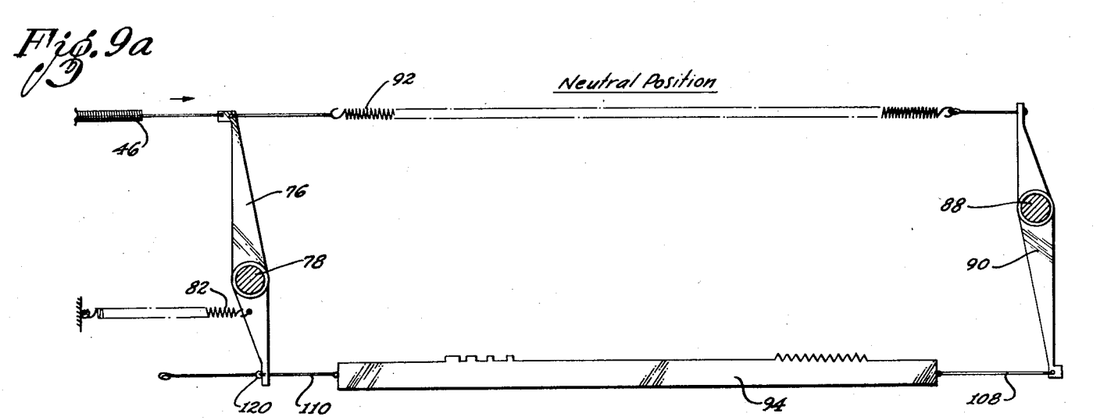
Figures 9A and 9B are schematic illustrations of one of the racks which is supported within the apparatus, and the manner in which that rack is controlled to be moved from a neutral position to a displaced position.
Figure 9B:
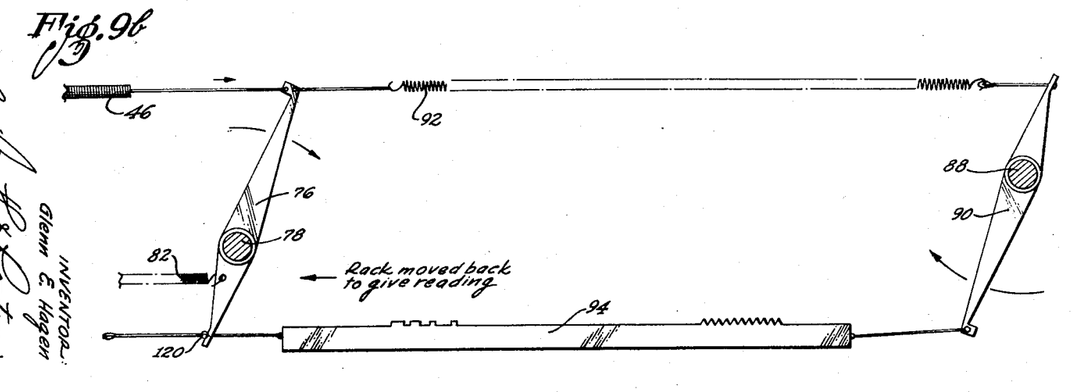

As shown, for example, in Figures 9A and 9B, when the rack at the adding machine is in its neutral position, its coupler 46 holds the lever 76 in an upright position. This causes the corresponding rack 94 to be held in a neutral position in the recorder of the invention. However, when the rack in the adding machine is moved to the right in Figure 3, the coupler 46 rotates the lever arm 76 a selected angular distance in a clockwise direction to the position shown in Figure 9B. As the lever arm 76 is so moved, its lower end engages a knob 120 on the wire 110 and moves the rack 94 to the left in Figure 9B to a selected printing position.

The spring 92 is normally under tension when the rack 94 is in its neutral position. This tension of the spring 92 is relieved somewhat as the rack is moved to its printing position, because of the unequal lever ratios of the levers 76 and 90. Now, when the coupler 46 is moved to the left in Figures 9A and 9B as the corresponding adding machine rack is returned to its neutral position, the spring 92 is placed under increased tension. The lower end of the lever arm 76 now slides forward on the wire 110, and the spring 92 quickly draws the rack 94 back to its neutral position. The spring 82 is a relatively weak spring and merely serves to maintain the arm 80 biased against the knob 120.

Each of the racks 94 is connected in the same manner as the rack illustrated in Figures 9A and 9B. Therefore, by the independent control of the mechanical couplers 46, the racks may be independently shifted to assume different operational states corresponding to the various digits to be recorded in each channel for the particular block being recorded at a particular time.

The paper recording tape 10 is supported on an input reel 130 which is keyed to the shaft 88 beside the side frame 52. A carbon tape 132 is supported on a reel 134 which is also keyed to the shaft 88 and which is mounted adjacent the reel 130. A take-up reel 136 is keyed to the shaft 88 at the other side of the assembly adjacent the frame 50. This take-up reel receives the paper tape after it has passed through the mechanism. A similar take-up reel may be keyed to the shaft 88 adjacent the reel 136 to take up the carbon tape 132 after the latter has passed through the mechanism.

The paper tape 10 and the carbon tape 132 from the reels 130 and 143 are passed under and over a rod-like bushing 138. Thus bushing extends outwardly from the side plate 96 at an inclination to this plate. The bushing is mounted on a guide rail 140. A bent-over guide piece 144 is affixed to the end of the bushing 138 by a screw 146 which extends through the guide into the bushing. This guide piece serves to maintain the paper tape and carbon tape on the bushing 138. The two tapes then pass through slots in the plates 96 and 98 across the recorder mechanism and over the printing racks 94. The racks 94 each have what may be termed an "information portion" which contains the segments referred to in the description of Figure 1. The two tapes 10 and 132 pass over this information portion, with the paper tape being next to the printing racks and the carbon tape being superimposed on the printing or recording tape.

The two tapes emerge outwardly through the plate 98 and under and over a cylindrical bushing 150. The bushing 150 is similar to the bushing 138 and extends outwardly from the plate 98 and inclined to the plate. A guide piece 152 is mounted on the bushing 150 by means of a screw 154, and this guide piece serves to hold the tapes on the bushing.

The tapes then pass over a roller 156 which preferably has a rubber rim. The roller 156 is supported and driven in a manner to be described to draw the tapes 10 and 132 through the recorder mechanism of the invention from one position to the next. This enables blocks of data to be recorded at spaced intervals along the tape.

A U-shaped bracket 158 is riveted to a leaf spring 160, and the leaf spring in turn is riveted to the guide piece 152. A roller 162 is supported by the U-shaped bracket 158, and the leaf spring 160 resiliently biases the roller 162 down on the tapes 10 and 132 as these tapes pass over the roller 156. Sufficient tension is provided by the leaf spring 160 so that the roller 162 holds the tapes against the roller 156 with enough force to enable the roller 156 to draw the tapes through the recorder mechanism.

The recorder assembly includes a first reciprocally mounted actuating arm 164. This actuating arm is adapted to ride on the guide rail 140. The actuating arm is slotted, and a fixed shaft 166 extends through the slot. A guide block 168 is rotatably mounted on the shaft 166, and the guide block rides in the slot in the actuating arm 164. The guide rail 140 is secured to a block 141 by a pair of screws 142. The block 141 is also rotatably mounted on the shaft 166.

In this manner, the actuating arm is constrained to move back and forth along the guide rail 140, and also is capable of some pivotal motion about the shaft 166.

A similar actuating arm 170 is adapted to reciprocate on a guide rail 172. The guide rail 172 has one end mounted to a block 125 by means of a plurality of screws 174. The block 175 is rotatably mounted on the shaft 166. The actuating arm 170 is also slotted, and a guide block 176 rotatably on the shaft 166 is adapted to move in the slot in the actuating arm 170.

A U-shaped yoke 178 has a first leg fastened to one end of the actuating arm 170, and it has a second leg fastened to the actuating arm 164. The yoke extends up over the top of the recorded assembly, and it straddles the side frames 50 and 52 of the assembly. The linkage arm 44 referred to in the description of Figure 3 is connected to the yoke 178 by a screw 180. Then, when the operating crank in the adding machine moves through its counterclockwise and through its clockwise half revolutions, the yoke 178 causes the actuating arms 164 and 170 first to move toward the reels 130, 134 and 136 and then to move back from the reels. During the first or forward motion of the actuating arms, they are pivoted slightly on the shaft 166 so that their ends remote from the yoke 178 move upwardly. Then, on the return stroke, the arms are pivoted slightly about this shaft in the opposite direction so that these remote ends move downwardly.

The guide rails 140 and 172 are pivotally mounted on the shaft 166 as described above. A spring 182 is secured to the free end of the guide rail 140, and a spring 184 is secured to the free end of the guide rail 172. The springs 182 and 184 extend upwardly and are fastened to a cross bar 186. This cross bar extends across the assembly between the plates 96 and 98. These springs bias the free ends of the guide rails upwardly towards the top of the recorder mechanism.

As previously stated, the tapes 10 and 146 are intermittently drawn in superimposed relation through the assembly and across the information portion of each of the racks 94. An imprint is made on the tape by a printing roller 201. This roller is moved in a reciprocal manner longitudinally of the racks 94 and down over the two tapes. The printing roller 201 is rotatably mounted on a shaft 200 which extends across the assembly from one of the actuating arms 170, 164 to the other.

A triangular-shaped guide bracket 202 is rotatably mounted on the shaft 200 between the actuating arm 164 and the plate 96. A similar guide member 204 is rotatably mounted on the shaft 200 between the actuating arm 170 and the plate 98.

The guide 202 has a stop member 206 extending outwardly from it which engages the actuating arm 164 and limits the counterclockwise rotation of the guide 202 about the shaft 200. This guide also has a stop 208 extending outwardly from it which limits the clockwise rotation of the guide. A spring 210 is fastened at one end to the stop 208 and extends around the stop 206 to the actuating arm 164. This spring biases the guide 202 in a counterclockwise direction.

In like manner, the guide 204 has a stop 212 which is adapted to engage the actuating arm 170 and limit the counterclockwise rotation of the guide on the shaft 200, and the guide 204 has a stop 214 which serves to limit the clockwise rotation of the stop. A spring 216 extends from the stop 212 around the stop 214, and this spring is fastened to the actuating arm 170. The spring 216 biases the guide 204 in a clockwise direction in Figure 4.

A cylindrical-shaped cam follower 218 is rotatably mounted on a shaft 220 which extends across the assembly through an aperture in the guide 204 and through an aperture in the guide 202. The plate 96 has an opening which defines a cam surface 222. Likewise, the plate 98 has an opening which defines a cam surface 224 having a configuration corresponding to that of the cam surface 222. The roller 218 rides along the cam surfaces 222 and 224. It will be seen that each of these cam surfaces has a central horizontal portion 225 which projects downwardly below the level of the end portions. The cam surface 224 has a surface portion 223 inclined downwardly and to the right in Figures 10A, 10B and 10C and a surface portion 221 inclined upwardly and to the right in those figures. The surface portion 223 is at the forward end of the cam surface 224 and the surface portion 221 is at the trailing end of the cam surface 224. The cam surface 222 has corresponding surface portions.

Figure 10A:
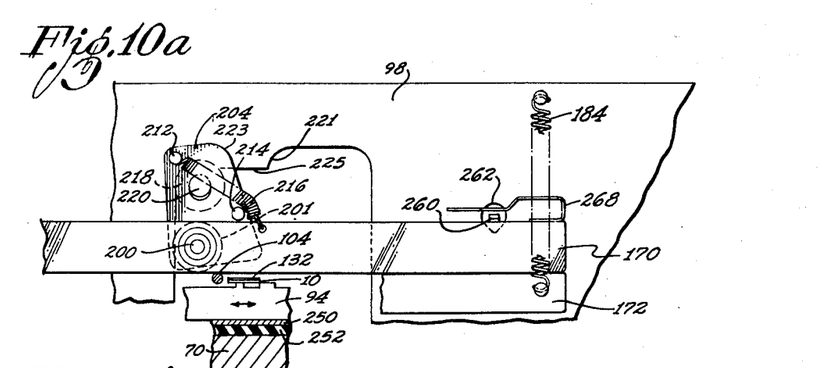
Figures 10A, 10B and 10C are fragmentary views of a side of the apparatus illustrating one of the actuating arms, and also illustrating how that actuating arm causes the roller to bear down on the tape periodically and bring the tape into contact with the racks of the apparatus, these views also showing a locking bar and the manner in which it is controlled to engage and lock the racks at appropriate times.

The action of the elements described above can best be understood by reference to Figures 10A, 10B and 10C. In Figure 10A, the actuating arm 170 for example has just started its forward stroke to the right in Figure 4 from its neutral position. For that position, the guide 204 is held at its forward limiting position by the spring 216, this position being limited by the engagement of the stop 214 with the arm 170. In this position, the printing roller 201 is displaced from the carbon tape 130 and from the paper recording tape 10.

Figures 10B, 10C, 11:
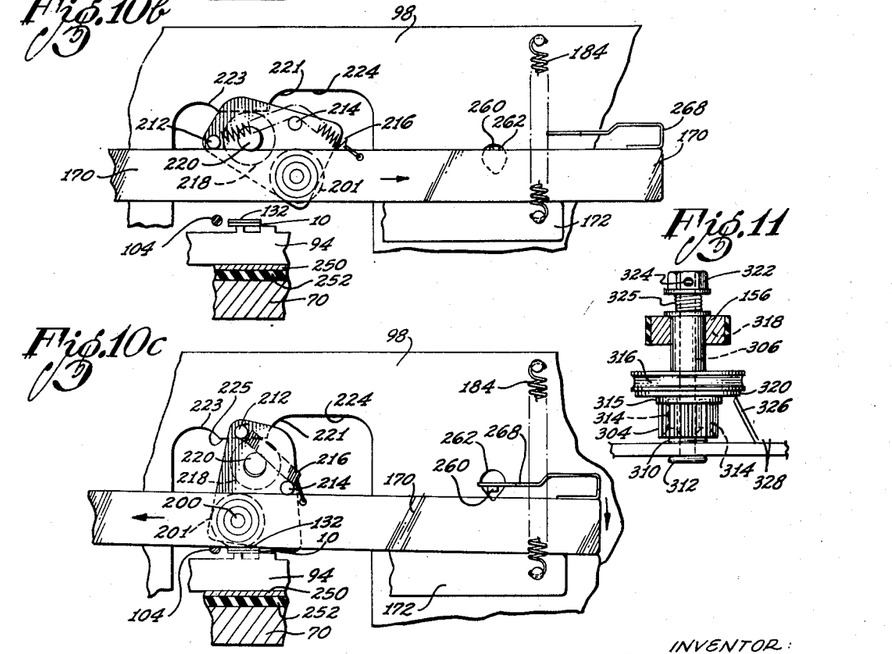
Figure 11 is a fragmentary view, partly in section, showing a clutch mechanism for coupling one of the actuating arms to a tape driving mechanism, the arrangement being such that the tape is drawn a selected distance through the apparatus on the forward stroke only of the actuating arms.

Then, as the actuating arm 170 is moved to the right to the position shown in Figure 10B, the cam 218 engages the inclined portion 223 of the cam surface 224, and the guide 204 is moved in a counterclockwise direction to its end position as limited by the stop 212. It will be observed that the cam roller 218 and the printer roller 201 are inclined with respect to one another in the position shown in Figure 10B. For this reason, the printer roller 201 is disposed upwardly from the tapes 132 and 10 so that it does not engage the tapes as the actuating arm is moved forwardly. The printer roller 201 does not engage the tape even during the time that it has been moved downwardly because of the movement of the cam roller 218 along the surface portions 225 of the cam surfaces 224 and 222.

On the return stroke, the cam roller 218 engages the surface portion 221 of the cam surface 224 and the corresponding portion of the cam surface 222 and tends to rotate the guide 204 in a clockwise direction. Such rotation, however, is limited by the engagement of the stop 204 with the actuating arm 170. The actuating arm 170 and its guide rail 68 are therefore pivoted downwardly. Because of this, the printing roller is moved downwardly on the tapes 132 and 10 when the cam roller 218 moves along the portions 225 of the cam surfaces 222 and 224. The portions 225 have a length corresponding substantially to the length of the portion 14 in Figure 1 and the notch to the right of the portion 14. In this way, the values of different digits can be printed on the tape 10 as shown in Figure 22.

The result is, therefore, that on the forward stroke of the actuating arms 170 and 164, the printing roller 201 passes over the tapes and is spaced from them so that no printing action occurs. However, on the return stroke, the cam 218 forces the printing roller down on the tapes so that the carbon 132 provides an impression on the recording paper tape 10 wherever the corresponding racks 94 present segments to the paper tape.

As shown in Figures 10A, 10B and 10C, the racks 94 move on a brass sheet 250 which functions as a shim and prevents wear of a rubber bedplate 252 on which the shim rests. The rubber bedplate, in turn, rests on the base plate 70 described above. The rubber bedplate 252 provides a measure of resiliency to the racks as the printing roller 201 moves over them so as to improve the printing action. The rubber bedplate 252 is also instrumental in maintaining the sharp contours provided by the notches and raised portions on the racks and therefore in prolonging the life of the racks.

The cooperation between the operating crank shaft 40 and the racks 36 of the adding machine of Figure 3 is such that the racks are first moved to position to set up a block of digits, and then the operating crank is operated. This enables the racks 94 of the recorder mechanism for each cycle of operation to assume individual operating positions prior to the operation of the actuating arms 164 and 170.

As noted above, the forward motion of the actuating arms does not produce a printing operation, but the return movement does. It is desirable that the individual racks be positively locked in their displaced positions for the return printing stroke of the actuating arms. This is accomplished by means of a transverse locking bar 260 which extends between the side plates 96 and 98. The bar 260 protrudes through an aperture 262 in the plate 98, and it also protrudes through an aperture 264 in the plate 96. The bar is susceptible of a limited vertical movement in the apertures 262 and 264, and its protruding ends rest on the respective upper edges of the actuating arms 164 and 170.

The actuating arm 164 has a bent-over leaf spring 266 mounted at its end adjacent the locking bar 260. This leaf spring is adapted to extend over one protruding end of the locking bar 260 as the actuating arms are moved to their positions of Figure 10C. The actuating arm 170 has a similar bent-over leaf spring 263 mounted at its end. This latter leaf spring is adapted to extend over the opposite protruding end of the cross bar 260 when the mechanism is in the operational state illustrated in Figure 10C.

Each of the racks 94 has what may be termed a "locking" portion in the vicinity of the locking bar 260. This locking portion of each rack comprises a series of teeth which may be engaged by the locking bar. Then, as the racks 94 are moved linearly to their selected positions for the printing of any block of digits, the teeth of the locking portion of each of these racks become disposed so that when the bar 260 is dropped it falls between various ones of the teeth. This enables the bar rigidly to hold the racks locked in their preset individual linear positions.

When the actuating arms 164 and 170 are moved to their forward positions, the ends of these arms remote from the yoke 179, as previously noted, are biased upwardly by the springs 182 and 184, and these ends maintain the locking bar 260 in cleared relationship with respect to the locking portion of each of the racks 94, this being shown in Figures 10A and 10B. However, during the return stroke of the actuating arms 164 and 170, when the printing operation is made, the ends of these arms remote from the yoke 178 drop to permit the locking bar 260 to fall across the locking portion of each of the racks 94. Now, the leaf springs 266 and 268 serve to bias the locking bar downwardly against the racks securely to hold it in position, the latter action being shown in Figure 10C. In this manner, the printing racks 94 are securely held in their pre-set linearly displaced positions during the return stroke of the actuating arms, and while the block of digits is being printed on the recording tape 10.

It was stated previously that the tapes 10 and 132 upon emerging from the recording mechanism of the invention pass between the rollers 156 and 162, and that the roller 156 is actuated to draw the tapes through the machine. It should be pointed out at this point, that as the tapes are drawn through the machine, the reels 130 and 134 both rotate to rotate the shaft 88 to which they are keyed. This causes the take-up reel 136 and any other reel that may be keyed to this shaft also to rotate to take up the respective tapes as they come out of the recorder.

The drive of the tapes through the recorder is accomplished by means of a rack 300 which is fastened to the actuating arm 170 by a series of screws 302. The rack 300 engages a pinion 304, and the pinion is rotated in one direction as the actuating arm 170 moves forwardly, and it is rotated in the opposite direction when the actuating arm 170 is returned to its original position.

As best shown in Figure 11, the pinion 304 is rotatably mounted on a shaft 306. The shaft 306 extends outwardly from the plate 98, and it is fastened to the guide rail 172 by any appropriate fasteners 310 and 312. The pinion 304 is fastened to a metal disc 315 by means of a series of screws such as the screws 314, the disc 315 being coaxial with the pinion 304 and rotatable on the shaft 306. A pulley 316 is also rotatably mounted on the shaft 306, and the roller 156 is fixedly mounted on a hub portion of the pulley 316 by means of a setscrew 318. It will be remembered that the tapes 10 and 132 pass between the roller 156 and the roller 162 after they emerge from the recorder mechanism. The pulley 316 has a rubber disc 320 fused to its face. This rubber disc is adapted frictionally to engage the metal disc 315 to which the pinion 304 is attached.

A knob 322 is affixed to the free end of the shaft 306 by means of a set screw 324, and a coil spring 325 is mounted on the shaft and is interposed between the knob 322 and the hub of the pulley 316. The pulley 316 is slidably and rotatably mounted on the shaft 306, and the spring 325 biases the rubber disc 320 on the pulley into frictional engagement with the metal disc 315 on the pinion 304.

An inclined leaf spring 326 is secured to the guide rail 172 by a screw or rivet 328. The spring 326 extends outwardly from the rail and it engages the rubber disc 320. The arrangement is such that when the pinion 304 is rotated in one direction by the actuating arm 170, the leaf spring 326 is urged by the rubber disc 320 in a clockwise direction in Figure 11 and down toward the plate 98. For this rotation, the coil spring 325 biases the rubber disc 320 of the pulley 316 against the metal disc 315 so that the pinion 304 drives and rotates the roller 156. This occurs on the forward stroke of the actuating arm 170. Therefore, when the actuating arm 170 is moved forwardly, the roller 156 is moved to draw the tapes a selected interval through the mechanism.

On the return printing stroke of the actuating arm 170, the leaf spring 326 is moved by the rubber collar 320 in a counterclockwise direction in Figure 11 corresponding to a direction upwardly and away from the plate 98. This causes the leaf spring 326 to tend to appose the action of the coil spring 325 and move the pulley 316 on the shaft 306 away from the pinion 304. This causes the assembly of Figure 11 to declutch so that the pinion 304 rotates freely and no rotational motion is translated to the roller 156. Therefore, on the return printing stroke of the actuating arms, there is no tendency for the mechanism to draw the tapes through the machine. The tapes, therefore, remain stationary throughout such return strokes to receive the printing impressions.

The invention provides, therefore, a completely mechanical rugged and sturdy data recorder mechanism for data processing purposes. The mechanism is compact, and it is relatively simple and inexpensive to construct and operate. Moreover, all the operating actions of the recording mechanism are positively and directly coupled to its actuating machine, so that the mechanism is precise and accurate in its operation and does not exhibit any tendencies for inaccurate or spurious operations. It will also be appreciated that the term "tape" as used in the specification and claims includes any convenient form of continuous medium on which information can be recorded by the apparatus constituting this invention.

I claim:

1. In apparatus for printing data on a tape in accordance with information supplied by control apparatus, a plurality of mechanical means coupled to the control apparatus for displacement in a first direction in accordance with information supplied by the control apparatus and disposed in cooperative relationship with the tape and having markings for a recording of information on the tape in accordance with the displacement of the mechanical means, means including a printing member movable in a single reciprocal stroke along the mechanical means upon the displacement of the mechanical means to press the mechanical means and the tape together for a recording in a block on the tape of the markings on the mechanical means in accordance with the displacement of the mechanical means, means for retaining the mechanical means in fixed positioning relative to the printing member during the printing of the information on the tape, and means for advancing the tape in a second direction transverse to the first direction upon the printing of information on the tape to present a new portion of the tape for the printing of information.

2. In apparatus for recording data on a recording medium in accordance with information supplied by control apparatus, a plurality of information members mechanically coupled to the control apparatus for displacement in accordance with information supplied by the control apparatus and for displacement in a direction transverse to the disposition of the recording medium, each information member having a plurality of first and second portions disposed relative to one another to provide individual markings on the recording medium in accordance with the displacement of the information member and in representation of different pieces of information, and means movable into cooperative relationship with the information members upon the displacement of the information members in representation of information from the control apparatus to provide a simultaneous recording of information for the different information members in a block through a plurality of the first and second portions on each information member.

3. In apparatus for recording data on a recording medium in accordance with information supplied by control apparatus, a plurality of information members mechanically coupled to the control apparatus for displacement in accordance with information supplied by the control apparatus, each of the information members having a plurality of first and second portions disposed to represent individual pieces of information dependent upon the displacement of the information member, the information member being disposed in cooperative relationship with the recording medium to provide a record on the recording medium, recording means movable reciprocally in the direction of movement of the information member, means for providing a displacement of the recording means from the information members in the forward movement of the recording means, means for retaining the information members during the return movement of the recording means, and means for moving the recording means into cooperative relationship with the information members during the return movement of the recording means to obtain a simultaneous recording of the information members.

4. In apparatus for recording data on a recording medium in accordance with information supplied by control apparatus, a plurality of information means each coupled to the control apparatus for positioning in accordance with information supplied by the control apparatus, each information means having first and second portions disposed in particular patterns relative to one another to provide individual patterns of indications representative of the positioning of the information means, means for retaining the information means in the plurality in fixed positioning during the recording of the signal information represented by the positioning of the information means, and means for providing a simultaneous recording in block form of the information represented by the positioning of the different information means in the plurality.

5. In apparatus for recording data on a recording medium in accordance with information supplied by control apparatus, a plurality of information members supported for individual reciprocal movement, means for moving the recording medium through the apparatus transversely to the path of said information members, means for bringing the recording medium and said information members together in a single stroke upon the selective positioning of the information members and upon the movement of the recording medium to record data on the recording medium in a block as established by the selected positions of said information members, and means for moving said information members to individual selected positions in one of the reciprocal directions in accordance with the information supplied by the control apparatus.

6. In apparatus for imprinting data on a tape in accordance with information supplied by control apparatus, a plurality of printing members supported adjacent one another for individual reciprocal movement, means for moving the recording tape through the apparatus and across a portion of each of the printing members, means for moving said printing members to individual selected positions in one of the reciprocal directions in accordance with information supplied by the control apparatus to control the portion of the printing members presented to the tape, and means for producing a cooperative relationship between the recording medium and the printing members upon the selective positioning of said members to imprint information on the medium as established by the selected positions of said printing members.

7. Apparatus for imprinting data on a tape, including: a housing including a pair of spaced frame members, a plurality of printing members supported adjacent one another for individual reciprocal motion, input reel means for supporting a roll of first tape and a roll of carbon tape, means for drawing the first tape and the carbon tape in superimposed relation through the apparatus and across a portion of each of said rack members, means for separately moving the printing members to individual positions representative of different information, and means for producing a cooperative relationship between the first tape and the carbon tape and the printing members upon the selective positioning of the printing members and upon the drawing of the first tape and the carbon tape through the apparatus to imprint information on the first tape as established by the relative positions of individual ones of the rack members.

8. Apparatus for imprinting data on a first tape through cooperation with a carbon paper and in accordance with information from control apparatus, including: a housing including a pair of spaced frame members, a plurality of printing rack members supported within the spaced walls of the housing for individual reciprocal motion, the means for drawing the first tape and the carbon tape in superimposed relation through the apparatus and across a portion of each of the rack members, means for receiving the first tape as the same is drawn through the apparatus by said drawing means, means for separately moving the rack members to individual positions in the reciprocal directions in accordance with the information from the control apparatus, and means for depressing the first tape and the carbon tape against the rack members upon the positioning of the rack members by the control apparatus to imprint information on the first tape as established by the relative positions of individual ones of said rack members.

9. In apparatus for recording data from control apparatus on a recording medium, a plurality of rack members separately movable to different individual positions and mechanically coupled to the control apparatus for such movement in accordance with data from the control apparatus, means for moving the recording medium through the apparatus and across the rack members, a roller member movable longitudinally of the rack members from a first position spaced from the rack members to a second position contiguous to the rack members, and means for moving said roller member from its first position to its second position upon the positioning of the rack members by the control apparatus to produce a cooperative relationship between the recording medium and the rack members for a recording of information on the medium as established by the relative individual positions of the rack members.

10. In apparatus for recording data from control apparatus on a tape, a plurality of rack members separately movable to different individual positions and coupled to the control apparatus for such movement, means for drawing the recording tape through the apparatus and across said rack members, a roller member, means including a reciprocating actuating arm coupled to said roller member for moving said roller member on a reciprocal in the direction of displacement of said rack members, means including a guide bracket coupled to said actuating arm for causing said roller member to be displaced from the rack members during the reciprocal movement of said roller in a forward direction and for causing said roller member to depress the recording tape against the rack members upon the reciprocal movement of said roller in the reverse direction for the recording of data on the tape, and means for advancing the tape during the forward movement of the roller.

11. Apparatus for recording data from control apparatus on a recording tape, including: a plurality of rack members separately movable to different individual positions in accordance with information supplied by the control apparatus, means for moving the recording tape through the apparatus and across said rack members, a roller member, a reciprocating actuating arm coupled to said roller member for moving said roller member in a direction corresponding to the movement of said rack members, means coupled to said actuating arm for causing said roller member to be displaced from the rack members during movement of said arm in a first direction and for causing said roller member to produce a cooperative relationship between the recording tape and the rack members upon movement of said arm in the reverse direction, and clutch means coupling said actuating arm to said tape-moving means to draw the recording tape a predetermined distance across the rack members upon movement of said actuating arm in said first direction and to decouple said actuating arm from said tape moving means upon movement of said arm in the reverse direction.

12. Apparatus for recording data from control apparatus on a recording tape, including: a plurality of rack members each having an information portion and a locking portion and each movable in accordance with information supplied by the control apparatus, means for moving the recording tape through the apparatus and across said rack members, a roller member, actuating means coupled to said roller member for moving said roller member reciprocally in a direction corresponding to the movement of said rack members, means coupled to said actuating means for causing said roller member to be displaced from the rack members during movement of said actuating means in one direction and for causing said roller member to produce a cooperative relationship between the recording tape and the respective information portions of said rack members upon movement of said actuating means in the reverse direction, and means including a locking bar extending across the respective locking portions of said rack members and coupled to said actuating means to be held by said actuating arms out of engagement with said rack members during the movement of the actuating means in said one direction and to be moved into engagement with the respective locking portions of said rack members when said actuating means are moved in the reverse direction to hold the rack members in fixed positioning during the recording of information on the tape.

13. In apparatus for recording data on a recording medium in accordance with information supplied by control apparatus, an information member provided with first and second portions disposed in a progressive code to record at any instant a particular plurality of increments corresponding to the patterns of the first and second portions presented for recording in representation of different values and movable through a particular number of increments less than the number of increments recorded at any instant to present different patterns of the first and second portions for the recording of successive values upon each movement of the member through the particular increments, and means for cooperating with the information member to obtain a recording on the medium of the particular plurality of increments representing the different patterns of first and second portions presented at any instant for recording.

14. In apparatus for recording data on a recording medium in accordance with information supplied by control apparatus, an information member provided with first and second portions to record first and second types of information on the medium, the first and second portions being disposed in a particular relationship in the direction of movement of the member and being provided with lengths of a particular incremental relationship for a recording of a particular plurality of successive increments at any instant and for the recording of such increments in accordance with the movement of the member in the first direction and for the recording of successive values upon successive movements of the rack member in the first direction through a particular number of incremental lengths less than the plurality of incremental lengths being recorded at any instant.

15. In apparatus for recording data on a recording medium in accordance with information supplied by control apparatus, an information member movable in a first direction and having a plurality of notches and raised portions disposed in the first direction in alternate relationship, the notches and raised portions in the information member being provided with a particular incremental relationship along the rack in the first direction to obtain a recording of a first particular number of increments in a pattern representing successive pieces of information upon each movement of the information member in the first direction through a second particular number of the particular increments less than the first particular number.

16. In apparatus for recording data on a recording medium movable through the apparatus, the combination of: at least one information member supported for movement to each of a plurality of different operating positions with respect to the recording medium in representation of individual pieces of information, and an information portion coupled to the information member for movement with the member and including a plurality of spaced marking segments disposed in an incremental code in which each individual piece of information is represented by a fixed group of successive marking segments and by a different group of successive marking segments in the plurality and in which each successive piece of information is recorded by moving the member through a particular number of increments less than the increments in the fixed group.

17. In apparatus for recording data on a recording tape in adjacent columns extending transversely across the tape by marking selected ones of a plurality of positions in each of such channels, the combination of: at least one information member supported for reciprocal movement across the path of movement of the recording tape to each of a plurality of operating positions in representation of individual pieces of information, and an information portion coupled to the information member for movement with the member and including spaced marking segments to present such segments to different positions in respective transverse recording channels on the tape in accordance with the movements of the information portion and in representation of the individual pieces of information.

18. In apparatus for recording data on a recording tape in spaced multi-digit blocks along the tape, with the individual digits of each block being recorded in channels adjacent to one another in a first direction and with each digit being recorded in a direction transverse to the first direction in a plurality of positions in each of such channels, the combination of: a plurality of information members supported adjacent one another in the first direction for individual movement in the transverse direction to each of a plurality of different operating positions with respect to the path of the recording tape to represent distinctive pieces of information, and an information portion disposed on each of the rack members and including spaced marking segments and movable with the information member to different positions in the first direction to present such segments to different ones of the plurality of positions in a corresponding channel on the recording tape for the recording of the various individual pieces of information.

19. Apparatus for recording data on a recording tape from control apparatus having a plurality of members movable from a neutral position to individual displaced positions corresponding to data to be recorded, including: a plurality of rack members supported adjacent one another for individual reciprocal motion in a first direction to a plurality of individual positions displaced from a neutral postion, means for periodically bringing the recording tape and the rack members into cooperative relationship to record information on the recording tape as established by the relative positions of the rack members, means for drawing the recording tape through the apparatus and across the paths of the rack members after the recording of information on the tape to present a new portion of the tape for recording, and individual coupling wires connected at one end to respective ones of said members of said control apparatus and at the opposite end to respective ones of said rack members and having properties to obtain a movement of the rack members in the first direction in accordance with the movement of said members in said control apparatus.

20. Apparatus as set forth in claim 15 in which means operative upon the information member are included to obtain a movement of the member through a number of increments in the first direction in accordance with the particular piece of information to be recorded.

21. Apparatus as set forth in claim 16 in which means are included to obtain a movement of the member through the different increments for recording the fixed group of successive marking increments on the medium in accordance with the positioning of the member and in which means are also included for advancing the medium upon each recording of information on the medium.

References Cited in the file of this patent

UNITED STATES PATENTS

| | | |
|---|---|---|
| 2,278,409 | Armbruster | Apr. 7, 1942 |
| 2,453,781 | Chisholm | Nov. 16, 1948 |

UNITED STATES PATENT OFFICE
CERTIFICATE OF CORRECTION

Patent No. 2,930,316                                    March 29, 1960

Glenn E. Hagen

It is hereby certified that error appears in the printed specification of the above numbered patent requiring correction and that the said Letters Patent should read as corrected below.

Column 14, line 29, before "in" insert -- basis --; column 16, line 42, for "postion" read -- position --.

Signed and sealed this 1st day of November 1960.

(SEAL)
Attest:

KARL H. AXLINE                                         ROBERT C. WATSON
Attesting Officer                                     Commissioner of Patents